G. D. HAYDEN.
VARIABLE SPEED MECHANISM.
APPLICATION FILED JULY 8, 1909.
977,449.
Patented Dec. 6, 1910.
2 SHEETS—SHEET 1.
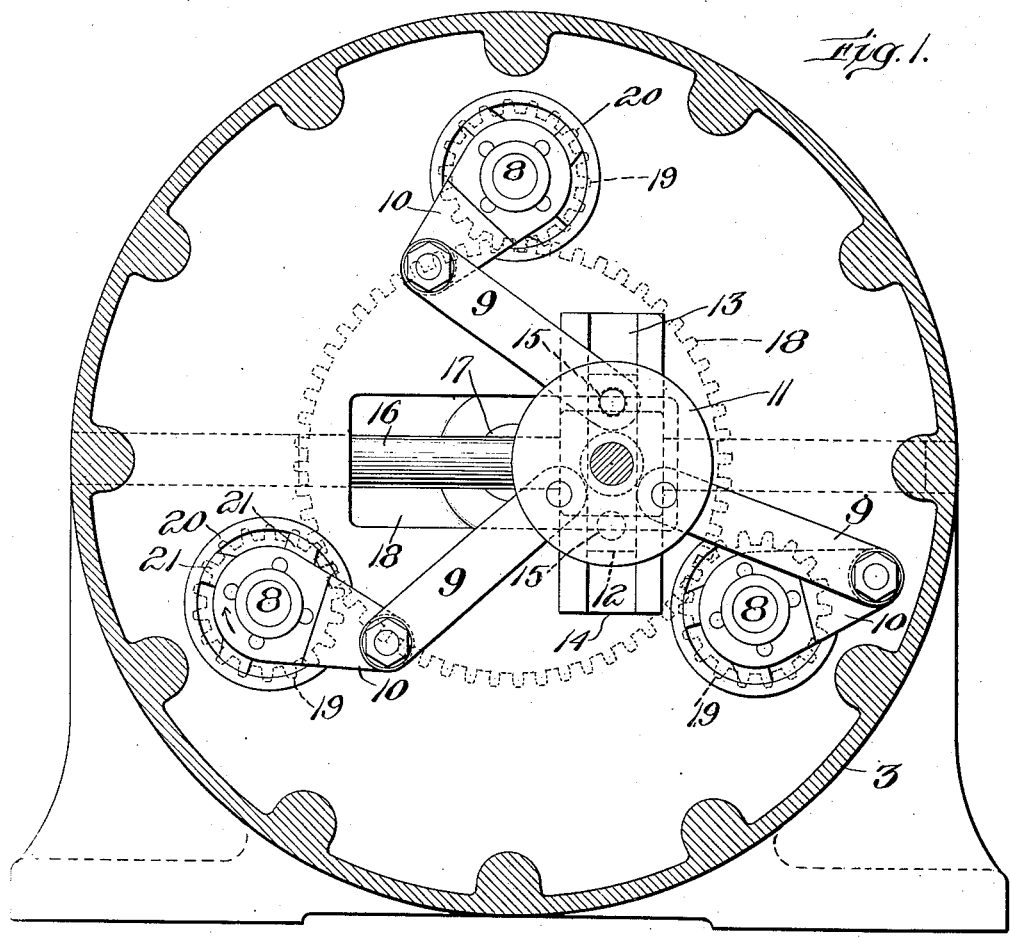
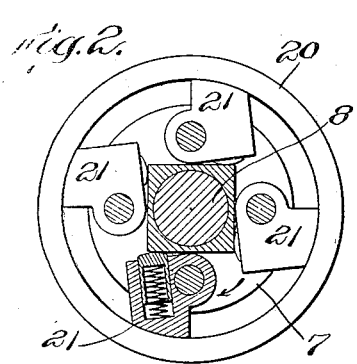
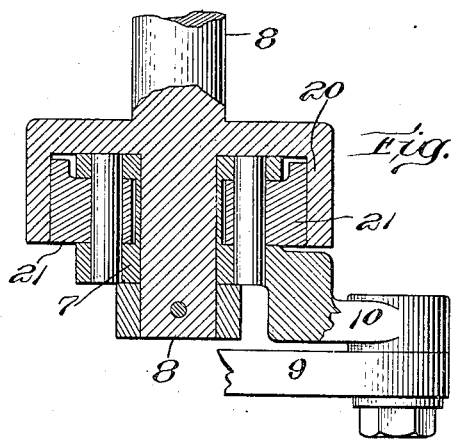
Witnesses:
M. L. Gilman.
K. D. McPhail.
Inventor:
George D Hayden
by Phillips Van Everen & Fish
Attys.

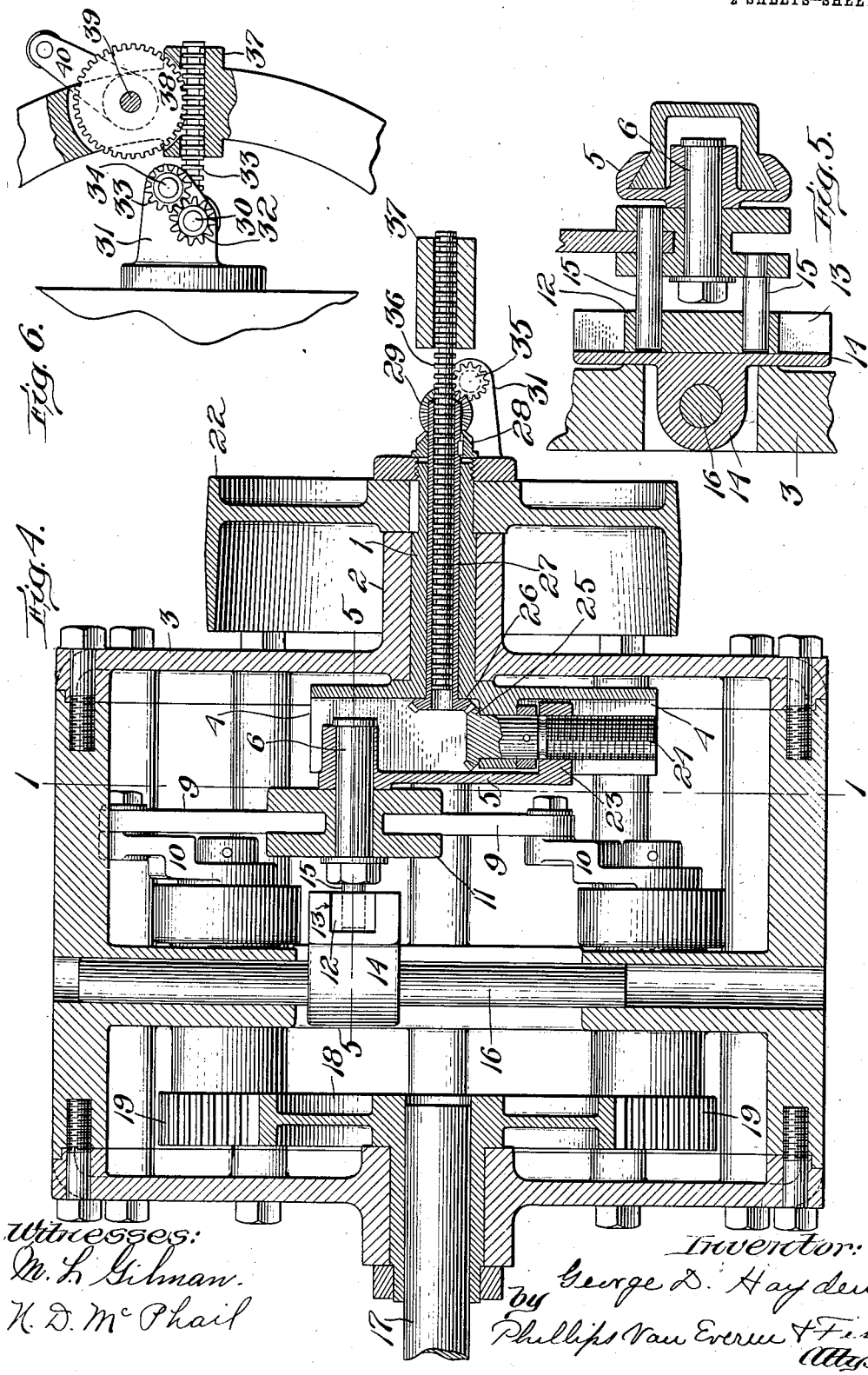

UNITED STATES PATENT OFFICE.

GEORGE D. HAYDEN, OF NEW BEDFORD, MASSACHUSETTS, ASSIGNOR OF ONE-HALF TO CHARLES R. HUNT, OF NEW BEDFORD, MASSACHUSETTS.

VARIABLE-SPEED MECHANISM.

977,449.  Specification of Letters Patent.  Patented Dec. 6, 1910.

Application filed July 8, 1909. Serial No. 506,455.

*To all whom it may concern:*

Be it known that I, GEORGE D. HAYDEN, a citizen of the United States, residing at New Bedford, in the county of Bristol and State of Massachusetts, have invented certain new and useful Improvements in Variable-Speed Mechanism; and I do hereby declare the following to be a full, clear, and exact description of the invention, such as will enable others skilled in the art to which it appertains to make and use the same.

The invention relates to variable speed mechanism for transmitting power from a driving to a driven shaft or other rotary member.

The object of the invention is to provide an improved and simplified construction and arrangement of power transmitting mechanism which may be adjusted to secure any desired ratio between the speeds of the driving and driven members.

To this end the invention consists in the combinations and features of construction and arrangement hereinafter described and referred to in the claims.

The various features of the invention will be readily understood from an inspection of the accompanying drawings, in which—

Figure 1 is a vertical sectional elevation of a variable speed mechanism embodying the various features of the invention, the section being taken on line 1—1, of Fig. 4; Figs. 2 and 3 are details of the ratchet clutch forming a part of the transmission mechanism; Fig. 4 is a horizontal sectional view through the axis of the driving and driven shafts; Fig. 5 is a sectional detail through the crank and connecting plate, taken on line 5—5, Fig. 4; and Fig. 6 is a bottom plan view partly in section showing a part of the mechanism for varying the speed during the operation of the mechanism.

In the mechanism shown motion is transmitted from a driving shaft to a driven shaft through an adjustable driving crank or eccentric carried by the driving shaft, and connected to impart oscillatory movements to a series of driving members which are arranged about the axis of the driving shaft, and are connected with the driven shaft through gearing or devices constructed and arranged to transmit motion to the shaft when the oscillatory driving members are moving in one direction, and to allow the oscillatory driving members to move idly when moving in the opposite direction.

The driving shaft 1 is mounted in a bearing 2 at one end of the casing 3, and is provided on its inner end with a radially extending head 4. A radially adjustable slide 5 is mounted on the head 4 and carries the crank 6, through which motion is transmitted from the driving shaft to the oscillatory driving members which are connected with the driven shaft. The oscillatory driving members, in the construction shown, comprise clutch members 7 arranged in a circular series about the axis of the driving shaft 1, and mounted to turn freely on the shafts 8. Three driving members 7 are shown arranged symmetrically about the axis of the driving shaft, but it will be understood that the number of driving members may be increased and varied as may be found desirable in order to secure the best results.

Each oscillatory driving member 7 is connected with the crank 6 by means of a link 9, one end of which is connected with the crank, and the other end of which is connected to an arm 10 extending radially from one end of the driving member. The inner ends of the links 9 may be connected with the crank by direct engagement therewith, or in any other suitable manner. It is preferred, however, to connect the inner ends of the links to a disk or plate 11 which is mounted upon the crank and is held from rotation as the crank revolves. This arrangement is especially desirable in case a comparatively large number of driving members are arranged about the axis of the driving shaft, since it enables numerous links to be connected with the crank and arranged in the same plane or in closely adjacent planes, and thus contributes to the compactness of the mechanism. As shown, the disk 11 for connecting the links with the crank is held from rotation upon its axis as the crank revolves by connecting the disk with a slide 12 guided in a vertical slot 13 which is formed in a horizontally movable head 14. The disk is connected with the slide 12 by means of two pins 15, one of which also forms the pivotal connection between the inner ends of one of the links and the disk 11. The head 14 is secured upon a rod 16 which is mounted to slide horizontally in bearings formed in the casing 3.

The connections between each of the oscillatory driving members 7 and the driven shaft 17 are so constructed that they will act to transmit motion to the driven shaft when the oscillatory driving members are moving in one direction, and will permit the oscillatory members to move idly in the opposite direction. In the construction shown, these connections comprise a gear 18 secured upon the driven shaft and engaged by pinions 19 secured upon the shafts 8. Each shaft 8 is also provided with a cylindrical flange 20 adapted to coöperate with a series of clutch pawls or shoes 21 carried by the driving members 7. The flanges 20, driving members 7, and clutch pawls 21, constitute one form of ratchet clutch through which motion may be imparted to the driven shaft as the driving member of the clutch is moved in one direction, while allowing free relative movements between the parts when the driving member of the clutch is moving in the other direction, or when the driven member of the clutch is moving at a higher rate of speed than the driving member of the clutch and in the same direction.

A continuous rotary motion may be imparted to the driving shaft 1 through a pulley 22, or any other suitable power transmitting connection, and during the rotation of the shaft oscillatory movements will be imparted to the clutch members 7 through the connections between each of said clutch members and the crank 6. At any given time during the rotation of the driving crank shaft, the shaft 17 will be driven by that clutch member 7 which is being moved forward or in its driving direction at the highest speed, and the clutch members 20 corresponding to the other clutch members 7 will rotate freely with relation to said clutch members. Each of the oscillatory driving members will therefore act successively in transmitting motion to the driving shaft, and a substantially constant speed in one direction will be imparted to the shaft. The speed and amplitude of the oscillatory movements imparted to the driving members 7, and therefore the speed of the driven shaft 17, may be readily varied by varying the radial distance of the driving crank 6 from the axis of the driving shaft.

In order that the speed of the driven shaft may be readily and conveniently varied, means is provided for adjusting the crank carrying slide 5, and this means is preferably so arranged that the adjustments of the crank may be made without interrupting the operation of the mechanism. In the construction shown, the crank carrying slide is provided with a nut 23 which is engaged by a screw rod 24 mounted in the head 4. The inner end of the screw rod is provided with a beveled gear 25 engaged by a beveled gear 26 formed on the inner end of a hollow shaft 27 which extends through the driving shaft 1, and is provided with a second beveled gear 28 near its outer end. The gear 28 is engaged by a beveled gear 29 secured to the inner end of a short shaft 30 which is mounted in a bracket 31 secured to the outer end of the driving shaft. The other end of the shaft 30 carries a pinion 32 which is engaged by a pinion 33 secured to the outer end of a second shaft 34 mounted in the bracket 31. The other end of the shaft 34 carries a pinion 35 which engages the teeth of a cylindrical rack bar 36. The cylindrical rack bar is guided and supported within the hollow shaft 27 and in a bearing 37 arranged beyond the outer end of the driving shaft. The outer end of the rack bar is engaged by a gear 38 secured upon a shaft 39 which also carries an operating handle 40. During the rotation of the driving shaft the pinion 35 rotates around the rack bar 36, and the teeth of the gear are in continuous engagement with the teeth of the rack bar. Whenever it is desired to vary the position of the crank 6, this may readily be done without interfering with the operation of the mechanism by turning the shaft 39 and thus moving the rack bar 36 forward or back, as the case may be. The longitudinal movement of the rack bar rotates the gear 35, and through the connections described, turns the adjusting screw 24 to vary the position of the crank 6 with relation to the axis of the driving shaft. By moving the crank 6 radially inward toward the axis of the driving shaft, the speed of the driven shaft 17 may be reduced, and by suitable adjustment of the crank any desired speed may be imparted to the driven shaft from zero to the maximum speed for which the mechanism is designed.

While it is preferred to employ substantially the specific construction and arrangement of devices shown and described, it will be understood that this specific construction and arrangement of the device is not essential except so far as specified in the claims, and may be modified and changed without departing from the broader scope of the invention.

Having explained the nature and object of the invention, and specifically described one form of mechanism in which it may be embodied, what I claim is:—

1. A variable speed mechanism having, in combination, a rotary driving member, a driven member, a series of oscillatory driving members arranged around the axis of the rotary driving member and connected to drive the driven member in one direction, and means for transmitting motion from the rotary to the oscillatory driving members comprising a driving crank, a plate mounted upon one end of the driving crank, a slide for guiding the movement of the plate, and connections between the plate and the oscillatory driving members, substantially as described.

2. A variable speed mechanism having, in combination, a rotary driving member, a driven member, a series of oscillatory driving members arranged around the axis of the rotary driving member and connected to drive the driven member in one direction, means for transmitting motion from the rotary to the oscillatory driving members comprising a driving crank, a plate mounted upon one end of the driving crank, a slide for guiding the movement of the plate, connections between the plate and the oscillatory driving members, and means for adjusting the position of the driving crank to vary the speed of the driven member, substantially as described.

3. A variable speed mechanism having, in combination, a driving crank, a series of oscillatory driving members arranged in a circular series about the axis of the crank, connections between the crank and each oscillatory driving member, a driven member, connections between the oscillatory driving members and the driven member for transmitting motion to the driven member in one direction, and means for adjusting the driving crank comprising a screw rod, a crank-carrying slide mounted thereon and means for rotating the screw rod during the operation of the machine whereby the speed of the driven member may be varied, substantially as described.

4. A variable speed mechanism, having, in combination, a driving crank, a series of oscillatory driving members, arranged around the axis of the crank, a plate on the crank, means for connecting the plate and each of the oscillatory members and means for preventing the rotation of the plate, substantially as described.

GEORGE D. HAYDEN.

Witnesses:
CHARLOTTE B. CHASE,
CHARLES MITCHELL.